Figure 1:
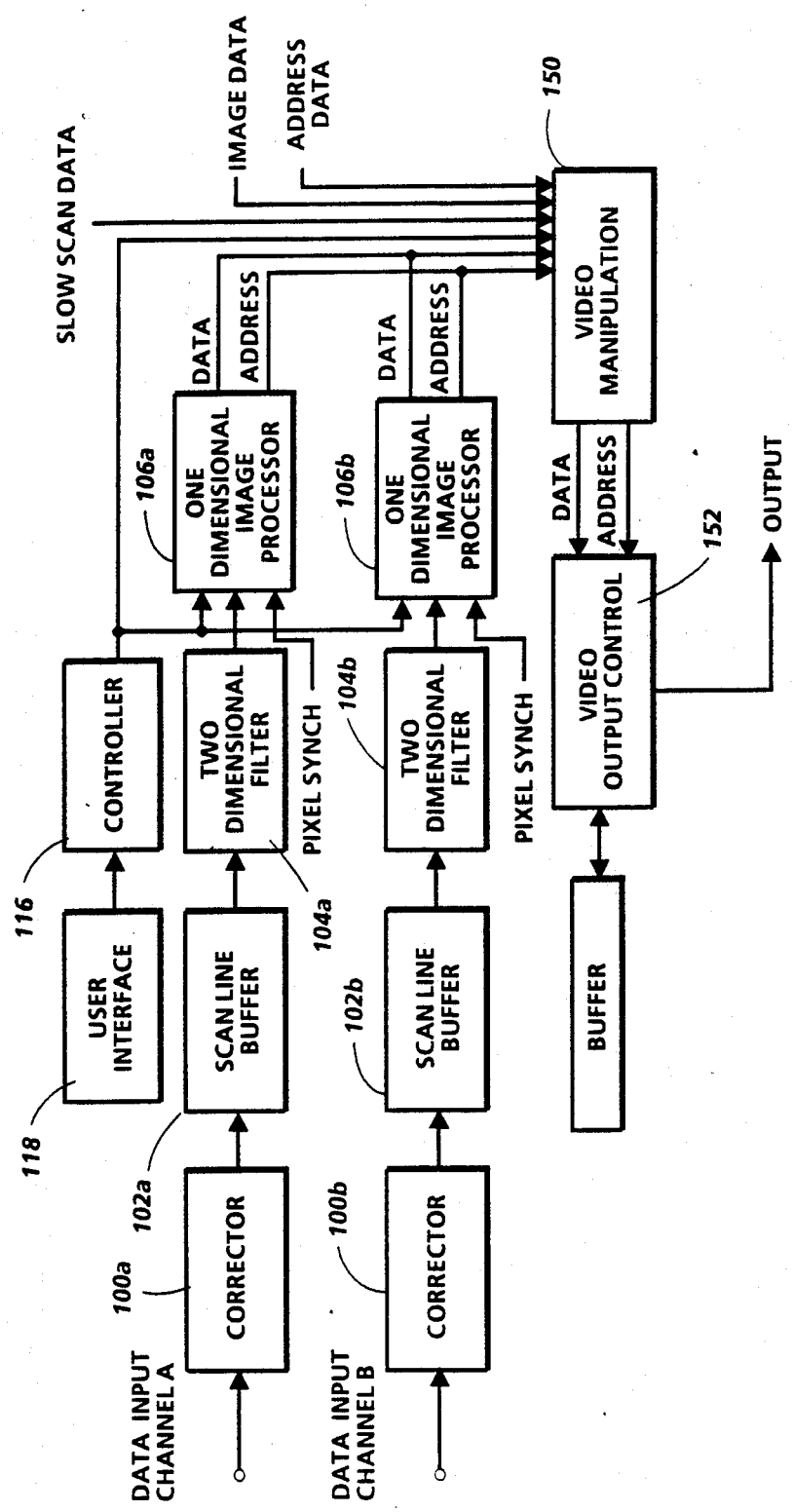

United States Patent [19]

Lin et al.

[11] Patent Number: 4,916,551

[45] Date of Patent: Apr. 10, 1990

[54] MULTI-CHANNEL IMAGE PROCESSING WITH CROSS CHANNEL CONTEXT

[75] Inventors: Ying-wei Lin, Penfield; Anthony F. Calarco, Fairport; Lisa M. Yamonaco, East Rochester, all of N.Y.

[73] Assignee: Xerox Corporation, Stamford, Conn.

[21] Appl. No.: 289,081

[22] Filed: Feb. 2, 1989

[51] Int. Cl.⁴ .............................................. H04M 1/04
[52] U.S. Cl. .................................... 358/483; 358/448
[58] Field of Search ............... 358/483, 482, 448, 471; 250/578

[56] References Cited

U.S. PATENT DOCUMENTS

| | | | |
|---|---|---|---|
| 4,439,798 | 3/1984 | Frame | 358/483 |
| 4,449,151 | 5/1984 | Yokota et al. | 358/471 |
| 4,692,812 | 9/1987 | Hirahara et al. | 358/483 |
| 4,775,799 | 10/1988 | Milch et al. | 358/483 |

OTHER PUBLICATIONS

"Parallel Processing Correlator For High Speed Capture Utilizing Multiple Array Segments"; Sheinberg et al; Recognition Equipment Inc.

Primary Examiner—Edward L. Coles, Sr.
Attorney, Agent, or Firm—Mark Costello

[57] ABSTRACT

A method and apparatus for processing a scan line of image data, wherein image data from portions of the scan line is processed simultaneously along plural channels, each channel processing a portion of the image data, and provided with context information from an adjacent portion of the scan line. Context pixels are added at the trail edge of a first scan line portion, derived from the lead edge of a second scan line portion. In certain image processing requiring preceding and succeeding pixel context information, subsequent to processing, on correctly processing pixels are transferred for subsequent processing, and pixels at the trail edge of a first scan line portion, and the lead edge of a second scan line portion are not transferred, leaving complementary scan line portions.

15 Claims, 3 Drawing Sheets

MULTI-CHANNEL IMAGE PROCESSING WITH CROSS CHANNEL CONTEXT

The present invention relates generally to a system for processing image data simultaneously over a plurality of channels, and more particularly to processing, image data over a plurality of channels with context maintained between channels.

CROSS REFERENCE

U.S. Pat. Application No. 124,123 filed Nov. 23, 1987 and assigned to the same assignee as the present application.

INCORPORATION BY REFERENCE

The patents cited herein are incorporated by reference.

BACKGROUND OF THE INVENTION

Digital image data may be acquired at an image input scanner from an image bearing original by illuminating the original and scanning the image thereon with an array of photosensitive elements that produce a response representative of sensed reflected light intensity. In certain situations it is desirable to provide a full width array (FWA), in which the array of photosensitive elements corresponds in length to the width of the original being scanned. Alternatively, a shorter array may be used, with appropriate magnification to accommodate the image to the length of the array. In either case, arrays may be formed from shorter arrays, butted together to form a single large array or staggered in close proximity and electronically stitched together to provide an apparently seamless response.

As the cost of manufacturing arrays with greater resolution, and accordingly larger numbers of photosensitive elements has become more reasonable, it has become desirable to increase resolution (the number of photosensitive elements across the array) and imaging speed. The result has been an dramatic increase in the quantity of image data which must be handled in a relatively short period, and desirably in real time (i.e., data is output from the image processing arrangement at approximately the same rate that it is acquired). One potential solution is to handle image data from portions of the array in separate channels, each channel separately processing image data from a portion of the array and subsequently stitching the channels together at the output to form the image. However, merely abutting the image data would cause a "seamed" appearance in the final output, because the various image processing routines applied to data require information about the neighbor of any particular pixel along the line, or context. Without this context information, an edge pixel in a channel will not be correctly processed.

U.S. Pat. No. 4,602,285 to Beaulier et al. suggests that a video transformation and filtering system provides parallel processing for a high speed real time system may include several filter processors in parallel, allowing target image data points to be processed simultaneously. U.S. Pat. No. 4,439,803 to Michael et al. suggests a distributed video frame store and real time processing system capable of processing in parallel different lines of video information for the video frame stored. The input processor is capable of synthesizing picture points from information related to adjacent picture points. In the Canon CLC-1 digital color copier, it is believed that 5 channels are provided for image data at the array, each channel sensing three colors of image data. Color image data from each channel is separated to form three streams, one for each color. These streams from different channels are merged, and later processed as a whole, in a single channel.

SUMMARY OF THE INVENTION

In accordance with the invention there is provided a method and apparatus for processing a scan line of image data, wherein image data from portions of the scan line is processed simultaneously along plural channels, each channel processing a portion of the image data, and provided with context information from an adjacent portion of the scan line.

In accordance with one aspect of the invention, data is derived at an array of photosites along an imaging bar. The imaging bar is divided into a plurality of roughly similar sized areas. The image information from each area to be processed independently along a channel. A first number of pixels is directed to the image processing elements of the first channel for processing. A second number of pixels is also directed to the first channel, from the second channel area of the imaging bar, the number selected to provide a necessary number of context pixels required for image processing algorithms used in the image processing section. A third number of pixels is directed to the image processing elements of the second channel, which includes the first channel context group, for processing. A fourth number of context pixels is also directed to the second channel from another channel, the number selected to provide the necessary number of context pixels required for image processing algorithms used in the image processing section for the second channel. Subsequent to processing, the pixels for which correct context processing was provided are directed further along the first the first and second channels, which for the first channel includes all the pixels except the last several pixels for which correct context was not provided, and which for the second channel includes all the pixels except the first several pixels for which correct context was not provided. The arrangement is repeated for however many channels are provided in the device. Other arrangements may be made for correctly processing the outer edges of the image. The outer edge pixels of the imaging bar have, of course, no further pixels to use as context, and are treated differently.

In order to accommodate the increased length of each scan line, the scan line synch signal, a clocking signal that defines wherein in a stream of pixels the scan line or scan line portion begins and ends, is varied so that the modified scan line synch signal, reflects the scan line or scan line portion as including both the original pixels and the added context pixels, when context pixels are added. Then, each image processing element which varies the number of pixels in the scan line modifies the scan line synch signal to reflect the number of pixels remaining in the scan line. Additionally, because the changed scan line portions now include different sets of pixels than originally, the scan line synch signal is varied in starting time and ending time, to reflect that the new pixel data on the channel.

By providing the pixels to be processed along a given image processing channel with context information regarding the adjacent image processing channel, certain image processing algorithms, including filtering and magnification functions are enabled. It can be seen that the addition of a selected number of context pixels to the preceding channel creates an overlap between channels that allows the first several pixels of the succeeding channel to be used as preceding context pixels.

Figure 2:
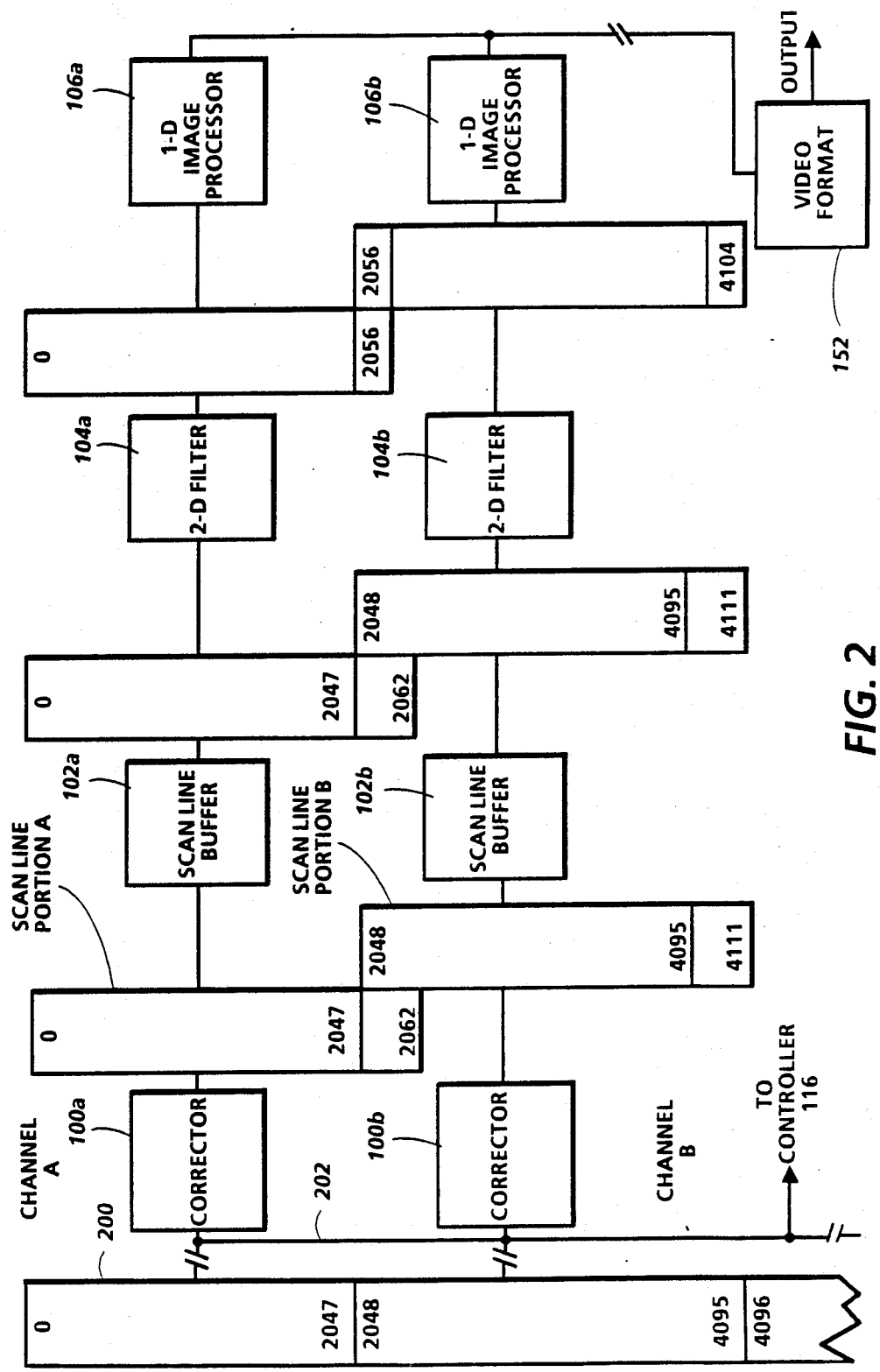
Figure 3:
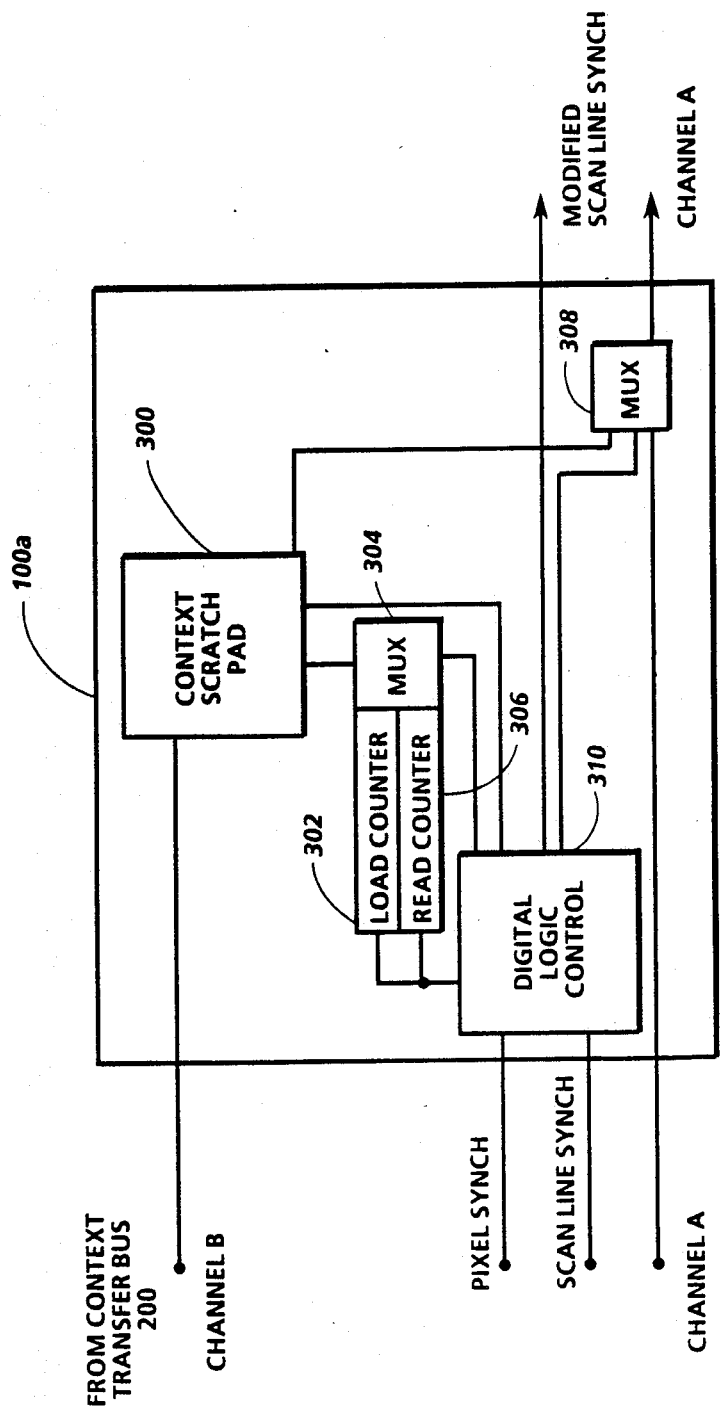

These and other aspects of the invention will become apparent from the following description used to illustrate a preferred embodiment of the invention read in conjunction with the accompanying drawings in which:

FIG. 1 demonstrates a block diagram of an image information processing system wherein the present invention finds particular use;

FIG. 2 demonstrates a cross channel context arrangement for the image information processing system shown in FIG. 1; and FIG. 3 demonstrates data transfer from channel to channel.

Digital image information in the form of image data picture elements, (hereinafter, pixels), digital voltage representations of image intensity at discrete locations in an image, is provided from a suitable source. For example, the image data pixels (or "pixels") may be obtained through line by line scanning of an image bearing original by one or more photosensitive imaging devices, such as a multiple element array of charge coupled devices, commonly referred to as CCD's. Line by line scanning of an image bearing original for the derivation of image information is well known and does not form a part of the present invention. Of course, it will no doubt be appreciated that image information may be computer generated, or provided from an electronically stored original. While the present invention finds particular utility with an image scanning device, including a line imager, and will be described with reference thereto, the invention may also find relevant use in a loop back mode, or with a processing system which may or may not include a scanner incorporating the invention.

With reference now to the drawings where the showings are for the purpose of illustrating a preferred embodiment of the invention and not for limiting same, in an application incorporating the present invention, FIG. 1 shows an image processing arrangement in accordance with the present invention. In the described embodiment, pixels may be initially derived from an imaging device (not shown in FIG. 1), typically comprising a scanning array of photosensitive elements, such as for example CCD's, which generate analog signals in accordance with exposure to light imagewise reflected from an original document. When image information is produced from a scanning device, it might be produced along several channels, herein exemplified by channels A and B, where each channel represents a portion of the scanning array from which pixel information is derived, each portion approximately, for example, 2048 pixels long. Providing plural channels will allow parallel and faster processing of the image information. In a high density scanning array, which may have a length corresponding to the full width of a document to be scanned, several channels may be present, but for the purpose of explaining the present invention, only two channels will be illustrated in FIG. 1. As used herein the term "channel" may refer to a portion or area of the imaging bar, or one of several similar parallel image processing arrangements, to which channels or portions of the imaging bar are connected. The portion of the scan line that is transmitted along a single channel is referred to as "the scan line portion". The channels of the imaging bar, and the scan line portions that they are processing will be assumed to be adjacent, and the pixels ordered from 1 to n across the channels. As a direction, "preceding" refers to a lower number pixel, or channel, while "succeeding" refers to a higher number pixel, or channel. "Upstream" refers to the processing direction towards the data input, while "downstream" refers to the processing direction towards the data output. In a stream, scan line or scan line portion of pixels, the first pixel is at the "leading edge" of the stream, scan line or scan line portion, while the last pixel "trailing edge" of the stream, scan line or scan line portion.

Each channel directs pixels, assumed to be converted at an analog to digital converter (not shown) functionally adjacent to the scanning array, from the analog signal initially derived from the scanning array to a digital signal, typically an 8 bit data byte, into correctors 100a, 100b. At correctors 100a, 100b, pixel values are normalized against a predetermined calibration to account for discrepancies in the sensitivity of each photosensitive element. The data is also deskewed to account for the order in which the pixels are derived from each photosensitive element in the scanning array, and correction algorithms account for bad photosensitive element locations in the array by various interpolation and bad pixel discarding routines. Corrected pixels are stored into scan line buffers 102a, 102b, which store a plurality of scan lines for operation by the two dimensional filters 104a, 104b. Two dimensional filters 104a, 104b convert halftone screened data into grey data for the prevention of moiré effects. The filters may also be programmed for other purposes, such as edge enhancement or noise removal. Because filtering routines useful in the conversion require information about the nearest neighbor pixels in both fast scan and slow scan directions to any particular pixel, scan line buffers 102a, 102b provide two dimensional filters 104a, 104b with data for groups of adjacent scan lines. The single lines connecting the various image processing elements represents data transfer between the elements. It will, of course, be appreciated that while data transfer is illustrated as along a single line, the 8 bit data byte may be transmitted serially or transmitted from element to element along 8 parallel data transmission lines. The single line also represents the modified scan line synch signal that will be transferred between elements, as described hereinbelow. As required, each element may also receive a pixel synch signal.

One dimensional image processors 106a, 106b (in common referred to as 106) are provided for operation on the data along each scan line. One-dimensional image processors 106a, 106b perform many common operations expected in image processing devices including, screening and thresholding, and magnification and reduction, and is enabled by a controller 116 for operation on data passing through one dimensional image processors 106a, 106b. Controller logic 116, which may be a microprocessor driven device, responsive to operator commands and selection of functions is user controllable through a user interface 118, to enable the desired processing function circuits. In addition to these operations, one-dimensional image processor 106 produces an address for each image data byte in a scan line, as additional data for combination with each image data byte passing therethrough to produce a new addressed image data byte. The result is that each addressed image data byte has associated with it an address portion or token defining an ultimate location along the scan line, as well as information regarding its intensity. Thus, for example each pixel might be defined by a 20 bit value, where 8 bits represent the image data byte intensity, and the remaining 12 bits are the address token. It will of course be appreciated that while the address line is illustrated as a single line, the 12 bit address token is transmitted from device to device along 12 parallel data transmission lines, although serial transmission of this data is possible.

In accordance with the invention, FIG. 2 demonstrates the principle behind cross channel context in an image processing arrangement. As previously indicated, scan line data arrives at correctors 100a, 100b from a source of image data along several channels, including pixels 0–2047, pixels 2048–4095, etc. In FIG. 2, an imaging bar 200 is shown divided into channels accordingly. It is assumed that the data is already in digital format, where the pixel value indicates a gray level value selected from a limited number of values when the pixels are directed to the correctors 100a, 100b. Correctors 100a, 100b are connected with a time sharing context transfer bus 200, which provides the actual data transfer from channel to channel. Controller 116 controls timing on bus 200, and particularly when data is transferred to and from the correctors.

With reference to Figure, each corrector 100a (corrector 100a shown without correction functions) includes a context scratch pad 300, such as for example, a 32×8 SRAM type memory for storage of context pixels. In the Example shown, pixels on channel B are directed to context scratch pad 300 along context transfer bus 200. A load counter 302 generates addresses for storage of the required number of context pixels at context scratch pad 300, the number selected in light of the context requirements of the downstream image processing elements, and controls the storage of the pixels at context scratch pad 300 through mux (multiplexer) 304. Read counter 306 controls context scratch pad 300 to forward the stored context pixels to channel A, at the appropriate time/Pixels at context scratch pad 300 area forwarded to channel A, through mux 308 controlled by digital logic control 310, at the appropriate point in the channel A stream of pixels. Load counter 302 and read counter 306 are each controlled by digital logic control 310, which controls context generation in accordance with the pixel synch and scan line synch signals. Additionally, digital logic control 310 produces the modified scan line clock signal required by the downstream image processing devices once the addition of the context pixels has lengthened the scan line portions directed along each channel.

With reference again to FIG. 2, with each scan line portion now represented at each channel with both the original channel information, and the context information, the information is passed to 2-D filters 102a, 102b. Thus, pixels 0–2062 are transmitted along channel A, pixels 2048–4111 are along channel B, etc. Scan line buffers 102a, 102b store data for several consecutive scan lines for context between lines, required for the filter functions of 2-D filters 102a, 102b. In a somewhat standard finite impulse response filter for screen removal for example, 5 pixels of context in the slow scan direction and 15 pixels in the fast scan direction are required. Thus, in the fast scan direction, along the scan line, 7 pixels preceding and 7 pixels succeeding the filtered pixel are required.

Transfer of pixels along the channel occurs at each image processing element occurs on when the scan line synch signal indicates that pixels are to be treated in the same line. Subsequent to filtering, or as part of the filter function, the scan line synch signal is modified so that some of the overlapping pixels fall outside the scan line clocking, and are therefore not transferred to the next image processing element. In channel A, the last 6 overlapping pixels in the scan line portion are not transferred to the next element, leaving pixels 0–2056 to be transmitted along channel A. In channel B, the first 7 pixels (and the last 6 pixels, assuming a third channel) are not transferred to the next element, leaving pixels 2056 to 4104 to be transmitted along channel B. It will be understood that only the relationship of two channels, A and B is being described. A third channel would require that the last 6 pixels of channel B would be discarded, and the first 7 pixels of the third channel be discarded, and so on. By using context pixels in the first channel as "substitutes" for the first several pixels in the second channel, context in the preceding direction is provided for the first pixels in the scan line portion handled by channel B.

As seen up to this point, channel A, originally including only pixels derived from a channel of imaging bar, now includes original pixels plus a group of adjacent pixels derived at an adjacent portion of the imaging bar. Channel B, originally including only pixels derived from a channel of imaging bar, now includes original pixels minus a number of preceding context pixels plus a group of adjacent pixels derived at an adjacent portion of the imaging bar. After filtering the number of overlapping pixels at the ends of the channels have been reduced to a single pixel. Magnification functions require a context pixel, because a typical magnification function might be given by, for example:

$$f_{mag}(p_n) = K(p_{n-1}) + (1-K)(p_n)$$

where $p_n$ and $p_{n-1}$ are adjacent pixels; and

K is the weighting factor determined by the magnification ration and the position of the desired new pixel.

Once the magnification function has been accomplished, the last overlapping pixels (Pixel 2056 in the example of FIG. 2) the scan line synch signal is once again varied to include on non-overlapping pixels, thus not transferring to the next element the last pixel, in this case, the channel A section. With the pixels stripped, the scan line sections have no further overlapping pixels. The magnification result may be a greater or lesser number of pixels than originally input to the 1-D image processor, depending on the magnification selected. The scan line synch signal now indicates that the scan line portion at channel A includes pixels 1–2055, while the scan line synch signal for channel B includes pixels 2056–4103. Thus, it can be seen that the scan line synch signals for channels A and B have been modified in length and starting and ending positions.

With reference to FIG. 1, the data in each section may be manipulated in content and position at video manipulation 150. With reference to FIGS. 1 and 2, at video output control 152, the lines are stitched together, and placed in order for output to a printing device, transmission device, storage device etc.

The invention has been described with reference to a preferred embodiment. While specific numerical examples were given, these example are intended as examples only. Actual numerical value may vary with imaging or data source devices, or filtering and magnification algorithms used. If filtering or magnification is undesirable, context does not need to be used. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

We claim:

1. An image processing device for processing image data including:
    an image data input receiving a scan line of image data including image data pixels, and directing adjacent portions of said scan line of image data along at least first and second channels, each channel including a plurality of similar processing elements, at least one of said processing elements requiring context pixels for correct operation, and an output to a data stitching arrangement;
    said first channel processing a first group of pixels, said first group of pixels including a first number of pixels directed to said the first channel from said image input, and a second number of pixels, useful for context derivation during processing;
    said second channel processing a second group of pixels directed to said the second channel from said image input;
    said second channel connected to said first channel so the second number of pixels in said first channel may be derived from the second group of pixels; and
    said data stitching arrangement for placing said scan line portions into appropriate order for output.

2. The image processing arrangement as defined in claim 1 including a scan line synch signal generating means for generating scan line control signals controlling operation at said processing elements on the scan portions, whereby processing occurs only during a period defined by the scan line synch signal.

3. The image processing arrangement as defined in claim 2, wherein said first and second channels each include a scan line synch signal modifying means, associated with the at least one processing element requiring context pixels, for modifying the scan line control signal at the at least one processing element so that the processing element processes only a correct number of pixels in a scan line portion during operation.

4. An image processing device for processing a scan line of pixels comprising;
    an image data input directing a first group of pixels 1 to n in the scan line to a first channel for processing;
    the image data input directing a second group of pixels from n+1 to m in the scan line to a second channel for processing;
    each channel including at least one element requiring context information for processing each pixel in said groups of pixels, said context information including a selected number of preceding and succeeding pixels in the scan line, and
    means for providing context information to the at least one element for processing pixels in the first channel from the second channel, by connecting said second channel to the first channel so the required number of context pixels for the first channel may be derived from pixels n+1 to m in the scan line.

5. An image processing element as defined in claim 4 including means in said one element for transferring only those pixels correctly processed with context information to a downstream element.

6. An image processing method for processing a scan line of pixels in portions, each scan line portion along a separate channel, each channel including at least one element requiring context information for processing each pixel in said groups of pixels, said context information including a selected number of preceding pixels and a selected number of succeeding pixels in the scan line, including the steps of:
    directing pixels 1 to n in the scan line to a first channel for processing,
    directing pixels n+1 to m in the scan line to a second channel for processing,
    deriving context pixels n+1 to q, where q<m from the second channel and directing said context pixels to the first channel as context information to said at least one element requiring context information.

7. An image processing method for processing a scan line including pixels 1 to m in portions, each portion along a separate channel, each channel including at least one element requiring context information for processing each pixel in said groups of pixels, said context information requiring preceding pixels and succeeding pixels in the scan line, including the steps of:
    directing a first scan line portion of pixels 1 to n to a first channel for processing;
    directing a second scan line portion of pixels n+1 to m to a second channel for processing;
    deriving a number of context pixels from the leading edge of the second scan line portion, and adding the context pixels to the trailing edge of the first scan line portion;
    subsequent to processing the first scan line portion by said at least one element in said first channel, transferring for further processing those pixels correctly processed with context information, and not transferring a second number of pixels from the trailing edge of the first scan line portion that were not processed correctly;
    subsequent to processing the second scan line portion by said at least one element in said second channel, transferring for further processing those pixels correctly processed with context information, and not transferring a third number of pixel from the leading edge of the second scan line portion that were not processed correctly.

8. The image processing method of claim 7, wherein the third number of pixels from the second scan line portion equals the number of preceding pixels required for the correct information for the second scan line portion.

9. The image processing method of claim 7, wherein the second number of pixels from the first scan line portion equals the number of succeeding pixels required for the context information for the first scan line portion.

10. The image processing method of claim 7, including the step:
    subsequent to discarding pixels from said scan line portions, stitching said scan line portions together.

11. An image processing method for processing a scan line including pixels 1 to m in portions, each portion along a separate channel, each channel including at least first and second elements requiring context information for processing each pixel in said groups of pixels, said context information requiring preceding pixels and succeeding pixels in the scan line, including the steps of:

directing a first scan line portion of pixels 1 to n to a first channel for processing;

directing a second scan line portion of pixels n+1 to m to a second channel for processing;

deriving a number of context pixels from the leading edge of the second scan line portion, and adding the context pixels to the trailing edge of the first scan line portion;

subsequent to processing the first scan line portion by said at least one element in said first channel, transferring for further processing those pixels correctly processed with context information, and not transferring a second number of pixels from the trailing edge of the first scan line portion that were not processed correctly;

subsequent to processing the second scan line portion by said at least one element in said second channel, transferring for further processing those pixels correctly processed with context information, and not transferring a third number of pixels from the leading edge of the second scan line portion that were not processed correctly;

subsequent to processing the first and second scan line portions by said second element in said first and second channels, transferring for further processing those pixels correctly processed with context information, and not transferring common pixel from either of the trail edge of the first scan line portion for the lead edge of the second scan line portion, whereby no common pixels between first and second scan line portions remain.

12. An image processing method for processing a scan line including pixels 1 to m in portions, each portion along a separate channel, each channel including at least one element requiring context information for processing each pixel in said groups of pixels, said context information requiring preceding pixels and succeeding pixels in the scan line, including the steps of:

directing pixels 1 to n in a scan line to a first channel for processing;

directing pixels n+1 to m in the scan line to a second channel for processing;

deriving q context pixels from the second channel, including pixels n+1 to n+q, where q<m, and directing said context pixels to the first channel for said at least one element requiring context information;

subsequent to processing by said at least one element in said first channel, discarding r pixels, where r<q, including pixels n+(q−r) to n+q from said first channel, whereby pixels 1 to n+(q−r−1) are left at the channel;

subsequent to processing by said at least one element in said second channel, discarding pixels n+1 to n+(q−r−1) from said second channel, whereby pixels n+(q−r) to m are left at the channel.

13. An image processing device for processing a scan line of pixels in portions along a plurality of channels comprising;

an image data input directing a first scan line portion in the scan line to a first channel for processing;

the image data input directing a second scan line portion from to a second channel for processing;

each channel including at least one element requiring context information for processing each pixel in said scan line portions, said context information including a selected number of preceding and succeeding pixels in the scan line, and means for providing context information for the first scan line portion from the second scan line portion, by connecting said second channel to the first channel so the required context information for the first scan line portion may be derived from pixels at the lead edge of the second scan line portion and added to a trail edge of the first scan line portion, means in said at least one element for discarding unrequired context pixels, including a first number of pixels at said trail edge of the first scan line portion and a second number of pixels at the lead edge of the second scan line portion, said first and second numbers together equaling said selected number of preceding and succeeding pixels.

14. An image processing device for processing a stream of pixels, a scan line at a time, in portions, along a plurality of channels comprising:

a scan line clocking signal generator, producing a clocking signal defining the beginning and end of a scan line portion;

an image data input directing first and second adjacent scan line portions in the scan line to first and second channels, respectively, for processing;

each channel including at least one image processing element requiring context information for correctly processing each pixel in the scan line portion, the required context information including a selected number of preceding and succeeding pixels in the scan line, said at least one image processing element operable during the clocking signal;

a context transfer bus, connecting the second channel with the first channel;

a context memory in at least said first channel storing a selected number of context pixels from said second channel, received thereat through the context transfer bus for addition to the first scan line portion as context information; and a modified scan line clocking signal generator, in at least said first and second channels producing a clocking signal defining the beginning and end of the scan line portion after the addition of the context pixels.

15. The image processing device defined in claim 14, wherein each of said at least one image processing elements requiring context information includes a modified scan line clocking signal generator, producing a modified clocking signal defining the beginning and end of the respective first or second scan line portions subsequent to processing, the defined scan line portion including only those pixels correctly processed with context information at the at least one image processing element.

* * * * *